(12) United States Patent
A Ahrens

(10) Patent No.: US 12,566,892 B2
(45) Date of Patent: Mar. 3, 2026

(54) REAL INTELLIGENCE (RI) VAULT OF PRECISE TIMES AND LOCATIONS FOR INDIVIDUALS AND EVENTS

(71) Applicant: Armor at Hand, Hermosa Beach,, CA (US)

(72) Inventor: Chad A Ahrens, Hermosa Beach,, CA (US)

( * ) Notice: Subject to any disclaimer, the term of this patent is extended or adjusted under 35 U.S.C. 154(b) by 70 days.

(21) Appl. No.: 18/332,707

(22) Filed: Jun. 9, 2023

(65) Prior Publication Data

US 2024/0411932 A1     Dec. 12, 2024

(51) Int. Cl.
*G06F 21/64*     (2013.01)
*H04W 4/029*     (2018.01)

(52) U.S. Cl.
CPC ............ *G06F 21/64* (2013.01); *H04W 4/029* (2018.02)

(58) Field of Classification Search
None
See application file for complete search history.

(56) References Cited

U.S. PATENT DOCUMENTS

| | | | | |
|---|---|---|---|---|
| 12,167,216 B2 * | 12/2024 | Kallai | ...................... | H04R 5/04 |
| 2008/0244704 A1 * | 10/2008 | Lotter | ..................... | H04M 1/66 |
| | | | | 709/206 |
| 2013/0268848 A1 * | 10/2013 | Pena | .................... | G06Q 10/109 |
| | | | | 715/255 |
| 2019/0141509 A1 * | 5/2019 | Copeland | ................ | H04W 4/02 |

* cited by examiner

*Primary Examiner* — Atta Khan
(74) *Attorney, Agent, or Firm* — Hartmans Law Group; Joel Fogelson

(57)          ABSTRACT

A system for validating communications and publications. A mobile device, such as an Internet of Things (IoT) device, generates time, location and possibly environmental data associated with an individual or an event. A secure storage vault stores the time, location, and environmental data generated by the mobile device or an associated server. The storage vault receives communications and publications associated with the individual or the event and that include their own created time, location, and environmental data; compares the stored data from the storage vault with the created data in the communications and publications; and verifies or refutes the authenticity of the communications and publications based on the comparison.

10 Claims, 4 Drawing Sheets

REAL INTELLIGENCE (RI) VAULT OF PRECISE TIMES AND LOCATIONS FOR INDIVIDUALS AND EVENTS

BACKGROUND OF THE INVENTION

In recent years, rapid advancements in artificial intelligence (AI) have introduced new capabilities but also new risks, challenging our ability to distinguish reality from fabrication. AI has become sophisticated enough to generate convincing simulations of text, audio, and visuals that portray individuals or events with such attention to detail that they can be mistaken for reality. These AI-generated simulations, often referred to as "deep fakes", have emerged as a significant concern due to their potential misuse and widespread distribution.

With the advent of deep learning and neural networks, AI systems can now create realistic simulations that can be deployed essentially anywhere around the globe. This increases the risk of misinformation and deception on a global scale, disrupting social, political, and economic dynamics. With AI becoming more prevalent, its potential abusive use can originate at various sources such as individuals, organizations, companies, and governments.

AI-generated simulations can be created in real-time, such as during phone calls, text exchanges, or streaming videos, making them difficult to distinguish from authentic live interactions. Additionally, these simulations can convincingly recreate past events, portray individuals who are no longer alive, place individuals in events at which they were not present, and so on, creating false narratives and potentially distorting historical records. AI can potentially be abused to create a multitude of such fabricated narratives involving individuals and events that can be very convincing, sometimes such that the fabricated narrative seems more "real" than the actual, true facts.

The risk posed by these false representations has never been more acute. In today's hyperconnected world, deep fakes can be disseminated rapidly and broadly through traditional and social media platforms. This swift propagation allows AI-generated simulations such as deep fakes to potentially influence large segments of the population before they can be detected and debunked.

The societal implications of unchecked AI-generated simulations are profound. Without the capacity to rapidly verify or refute the authenticity of communications and publications, individuals, communities, cultures, and nations face significant risk. If AI-generated simulations are erroneously perceived as true, they can result in substantial harm. This can manifest in various forms, including coerced actions based on deceptive information, unnecessary activation of emergency agencies, destabilization of financial markets, and at the extreme, the initiation of military conflicts based on false premises.

Given this escalating challenge, it has become essential to devise and implement measures to detect and combat the spread of AI-generated simulations such as deep fakes. A solution that can swiftly and accurately identify AI-generated simulations will help protect the integrity of our information ecosystem, safeguard individuals and institutions, and uphold the foundations of trust that our society relies on.

SUMMARY OF THE INVENTION

The present invention offers a solution to these issues by introducing a robust protection system utilizing a real intelligence (RI) vault. The system of this disclosure is designed to securely record and store specific times and locations linked to individuals and events, thereby establishing an authoritative temporal and spatial record for those individuals and events. In some implementations, additional data points may be collected and stored for enhanced verification. In addition to precise location coordinates and timestamps, for example, environmental conditions associated with those instances such as temperature, humidity, barometric pressure, wind speed, and more may also be collected and stored.

The present invention captures and securely preserves the exact locations and times of individuals or events in a secure storage vault. This data serves as an authoritative record that can later be leveraged for comparison against the temporal and spatial data associated with a given communication or publication. This comparison process facilitates differentiation between authentic and potentially manipulated content. The comparison process may occur in real-time or near real-time for live communications, encompassing formats such as phone calls, text messages, and live streaming communications. The system also lends itself to "on request" comparisons conducted post-event.

The present invention quickly verifies the authenticity of a communication or publication via mechanisms that contrast the genuine time and location data stored in the secure storage vault against the data presented in the content under examination. One such mechanism is an automated process that uses a matching algorithm to rapidly scan the time and location information within the communication or publication and compare it to the securely stored time and location information. By meticulously comparing these sets of data, the algorithm can swiftly identify discrepancies or alignments, thereby gauging the validity of the communication or publication presented. In addition to this automated comparison, the invention also provides a platform for human verification by presenting the securely stored and purported time and location data in a format to enable users to manually compare the data sets, thereby providing an additional layer of scrutiny.

By integrating both automated and human verification processes, the present invention offers a robust and comprehensive solution to the challenge of discerning genuine communications and publications from potentially manipulated ones. Its dual-faceted approach harnesses the precision of algorithmic comparison and the intuitive judgment of human scrutiny, providing a reliable tool in the fight against misinformation and artificially simulated content.

DETAILED DESCRIPTION OF THE INVENTION

Figure 1:
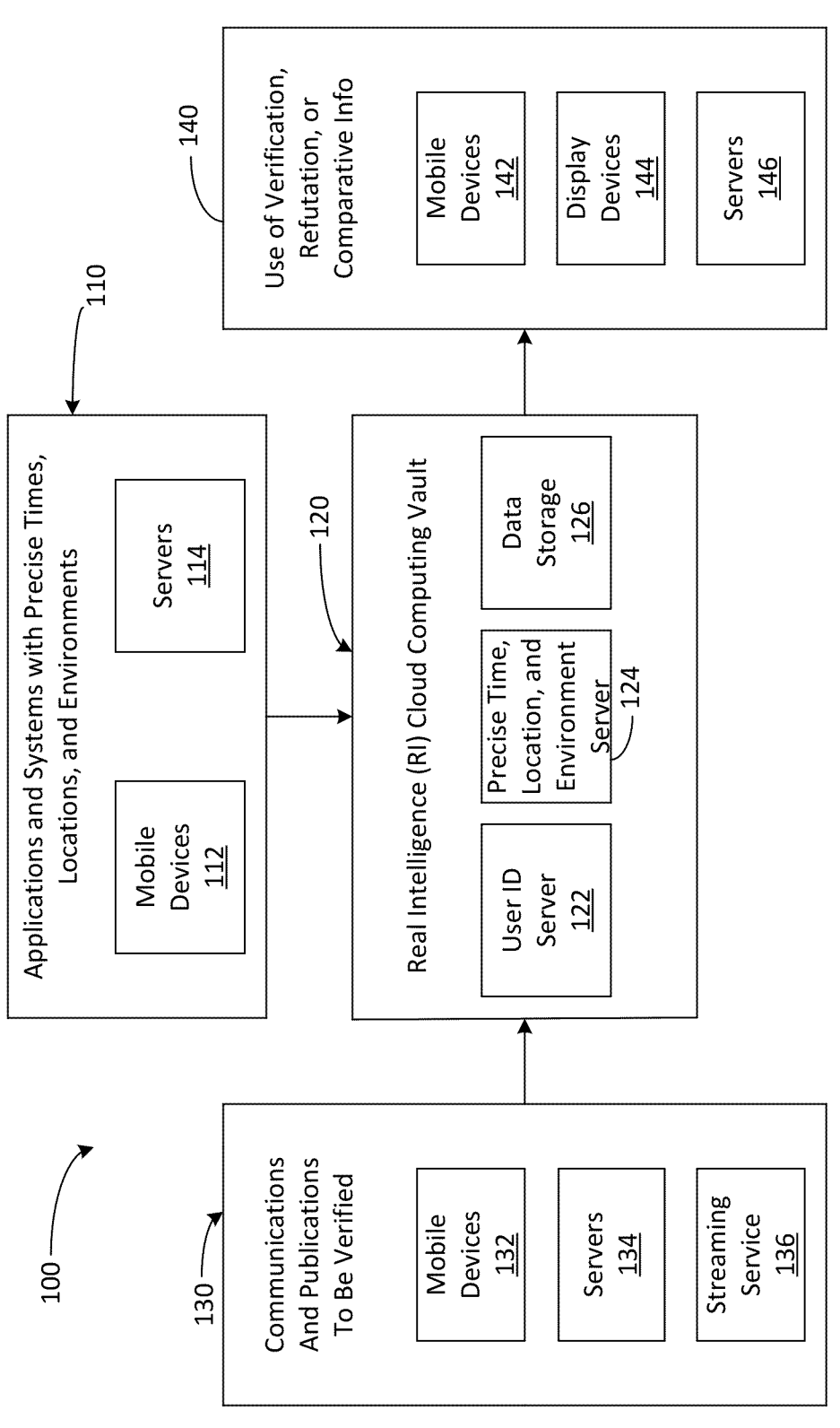
FIG. 1 is a conceptual block diagram of a system using a real intelligence vault of precise times and locations for individuals and events, according to the present invention.

FIG. 1 is a conceptual block diagram illustrating the structure of a system, designated as system 100, in accordance with the present invention. Central to system 100 is a secure component referred to as real intelligence (RI) vault 120, which acts as a secure and reliable repository for storing precise temporal (time) data, spatial (location) data, and possibly additional data such as environmental conditions associated with individuals and events.

Various applications and systems, denoted as block 110 in the diagram, may be responsible for generating this precise data, which encompasses time and location information, and potentially, additional data points such as environmental details tied to the individual or event in question. The incorporation of additional data such as environmental conditions offers an extra dimension of information, enriching the context for each individual or event. The generation of this detailed data may originate from mobile devices 112 that operate within applications and systems 110. Mobile devices 112, many of which are equipped with an array of sensors and connectivity features, are capable of creating a rich data profile that includes precise time data, location data, and, where applicable, environmental conditions associated with an individual or event.

Applications and systems 110 and mobile devices 112 work in unison to generate detailed time, location, and possibly additional data such as environmental conditions. This data is then securely stored within RI vault 120, creating a robust repository that supports the system's core function of verifying the authenticity of communications and publications.

There are many examples of applications and systems 110 incorporating technologies for generating precise time and location data, particularly in the context of mobile devices 112. Some illustrative and non-limiting examples of technologies that may be incorporated by applications and systems 110 are as follows. The Global Positioning System (GPS) employs a constellation of satellites orbiting Earth to provide exact location data anywhere a GPS signal can be accessed. GPS also delivers highly precise time data, leveraging the atomic clocks embedded in the satellites, which is essential for calculating distances and, subsequently, accurate locations. Mobile phones maintain regular communication with nearby cell towers. This interaction allows for determination of both the time of communication and the exact location, using triangulation methods involving multiple cell towers. When a device connects to a Wi-Fi network, its general location can be approximated based on the known location of the Wi-Fi router. Further accuracy can be achieved by employing databases of Wi-Fi network locations, which can be particularly useful indoors where GPS might be less reliable. For short-range location detection, technologies such as Bluetooth and near field communication (NFC) come into play. These technologies can ascertain if a device is in close proximity (usually within a few meters) of another device or signal source. Geofencing defines a virtual geographic boundary and triggers a response when a mobile device enters or leaves the predefined area. Beacon devices may provide location-based services to mobile devices within their vicinity. Finally, ultra-wideband (UWB) technology can provide high-precision, real-time tracking of objects and people, and may be used for indoor positioning and other applications where GPS is not feasible or accurate enough.

Another type of technology for generating precise time and location data, particularly within a building or other contained area, is a real-time location system (RLTS) that tracks the location of people, mobile devices, or objects in real time. RLTS systems use of variety of technologies such as radio frequency identification (RFID), ultra-wideband (UWB), infrared (IR), Wi-Fi, and Bluetooth to detect and locate tagged people, mobile devices, or objects. RLTS systems can provide granular detail about the location of tracked items, down to a specific room or even a particular spot within a room, depending on the technology used. The time and location data from an RLTS can be used to provide live (real-time) tracking information on dashboards, in software applications, or integrated into a larger system such as applications and systems 110. Collectively, technologies such as these empower various applications and systems 110 to generate rich, precise data concerning the time, location, and other data associated with individuals and events.

Various types of mobile devices 112 may be configured to generate precise time and location data, with some capable of capturing additional data such as environmental conditions. Some representative examples of mobile devices 112 are as follows. Smartphones typically have built-in GPS and clock functionality. They can provide accurate time and location data at practically any moment. Some smartphones may also possess sensors capable of measuring environmental parameters, such as temperature, humidity, and barometric pressure, for example, adding further depth to the data gathered. Tablets and other computing devices also have the ability to generate time and location data. This information can be gathered through a multitude of methods, including GPS, Wi-Fi network locations, or even IP addresses, depending on the level of functionality the computing device offers. Wearable devices, such as smartwatches and fitness trackers, constantly monitor and record the wearer's location and time throughout the day. Some of these devices also collect environmental data and personal biometrics, which can enrich the dataset with details about the user's surroundings and physical state. Vehicles may be fitted with GPS technology that not only serves navigational purposes but also tracks the vehicle's movements. This technology may generate time-stamped location data, creating a trail of the vehicle's journey over time.

Internet of Things (IoT) devices are another type of mobile device 112 that often have the capability to detect location and record time-stamped activities. IoT devices sometimes have autonomous monitoring with specialized sensors and edge computing capabilities. One example of an application and system 110 incorporating technologies for generating precise time and location data, in the context of mobile devices 112, is described in applicant's issued U.S. Pat. No. 11,595,786 and co-pending application publication no. 2022/0345869, both of which are entitled "Early Alert and Location Intelligence Geographic Information System" and are incorporated herein by reference. These patent publications describe an early alert and location intelligence geographic information system (GIS) (referred to herein as the "RescueGIS System") that includes a plurality of mobile devices 112 in the form of Internet of Thing (IoT) devices. The RescueGIS system utilizes precise locations and, when activated, tracks locations and movements of the IoT devices when an IoT device signals detection of a threat or an urgent medical need. The location data and time data collected from the IoT devices by the RescueGIS system may be used in the context of the present invention, with the user's consent and verification, by being provided to and securely stored in RI vault 120.

Applications and systems 110 may capture additional information pertaining to the spatial organization and context of an event or incident, such as specific details about the architectural layout of the site, the property parcel, and the city or municipality where the event or incident took place. The RescueGIS system discussed above, for example, employs geographic information system (GIS) technology to precisely delineate the geographic boundaries of a geographic area, wherein a geographic area may be a site, a parcel, a city, a rural area, or any other geographic area associated with an incident. When used in conjunction with RI vault 120, for example, RI vault 120 may record an incident that transpired within the confines of a specific property parcel. This data can then be compared with a publication or report that purports that an event took place at specific X, Y, and Z coordinates. If those coordinates fall outside the recorded parcel boundaries stored in RI vault 120 where the actual event was known to have occurred, it signals a potential discrepancy. This level of detail can be particularly useful when attempting to verify or refute claims about the location of an event, thereby enhancing the reliability and accuracy of the system's overall verification process. In addition, use of geographic boundaries provides substantial processing speed efficiencies.

In view of privacy concerns and a user's control over their own data, it is critically important that a user's verification and approval first be obtained before tracking and storing their location data. In normal operation of the RescueGIS system mentioned above, for example, the tracking of user location and movements is not a continuously ongoing process but rather is initiated only under specific circumstances, such as when a threat is detected or an urgent medical need arises. However, if the user explicitly consents to use of continuous tracking and storage of their time, location, and possibly other data in RI vault 120, the locations and movements of the user can be tracked on a continuous basis. This continuous stream of information can be securely stored within RI vault 120, creating a comprehensive record of the user's spatial-temporal footprint. The user's agency in choosing to have their movements tracked balances privacy concerns with the benefits of continuous tracking.

Thus, a wide array of mobile devices 112, each with its unique capabilities and functionalities, can be leveraged to provide precise time, location, and sometimes, additional data such as environmental conditions. This enhances the robustness of system 100 and vault 120, improving its ability to verify the authenticity of communications and publications.

Applications and systems 110 also include servers 114. Servers 114 ensure the secure handling and storage of data and may act as a central repository for data collected from various mobile devices 112, possibly filtering and organizing the data gathered. Servers 114 may also serve as a communication hub transmitting data between mobile devices 112 and RI vault 120.

Once a mobile device 112 has generated precise time, location, and where necessary, environmental data, this information is then transmitted for secure storage in the specialized repository referred to as real intelligence (RI) storage vault 120. This transmission of data may be sent directly from mobile devices 112 to RI vault 120, offering a streamlined, direct link between data generation and storage. Alternatively, the data may be transmitted through one or more intermediary servers 114. This additional step may offer benefits such as enhanced data processing or improved security measures.

In some instances, applications and systems 110 and mobile devices 112 may be configured to regularly sample the time data, location data, and possibly additional data such environmental data, associated with an individual or event. This regularly sampled data is relayed to RI vault 120 for secure preservation. Alternatively, RI vault 120 may request applications and systems 110 and mobile devices 112 to regularly sample time, location, and possibly, environmental data and to relay that data to RI vault 120. The frequency of this sampling can be tailored to the specific needs of a particular application, ranging from a daily sampling to several times per second. For a moving individual or event, frequent sampling allows for more accurate tracking of changes in location.

By sampling and storing the location of an individual or an event, for any duration and frequency of sampling desired, the system enables robust verification or refutation of communications and publications. This is achieved by comparing the asserted location and time of the communication or publication with the actual, securely stored location and time data of the individual or event in RI vault 120. In essence, the process from data generation by mobile device 112, through transmission, to secure storage in RI vault 120, forms a resilient chain of data custody. This process aids in ensuring the integrity of information and enhances the system's ability to effectively authenticate or refute claims in communications and publications.

Additional data points may be collected and stored for enhanced verification. One example of such additional data points, as noted above, is an environmental condition associated with the time and place of an individual or event. Environmental data such as temperature, humidity, barometric pressure, wind speed, and more, for example, may be collected and stored. Take, for instance, the barometric pressure at a given time and place. System 100 can accurately measure and record this data, integrating it into the record stored in vault 120 for that particular moment and location. In this way, a more thorough and nuanced record of the event is created, further fortifying the verification process. This multifaceted approach to capturing and storing data makes it more challenging for AI-generated simulations to mimic and reproduce the complex interplay of these variables accurately. As such, the invention provides a powerful tool for distinguishing between genuine events and artificial constructs.

RI storage vault 120, serving as a secure data repository, meticulously stores and manages user-associated time data, location data, and possibly additional data such as environmental conditions, thereby providing the ability to verify or refute the authenticity of communications and publications. RI vault 120 is composed of several components: user ID server 122, precise time, location, and environment server 124, and data storage component 126. These components work together to store and manage data received from systems and applications 110, including time data, location data, and potentially additional data such as environmental conditions, which are associated with a specific user through a unique identifier or name.

User ID server 122 manages and validates user identities, ensuring that each data set is correctly linked to its corresponding individual or event, establishing a clear connection between the data and its source. Precise time, location, and environment server 124 processes and manages the time, location, and possibly environmental data, and may assist in preparing the data for storage and retrieval. Data storage component 126 is the primary repository for the data. Here, the user-associated data—comprising precise time, location, and potential additional data—is securely stored for future reference. This could involve various storage technologies, from traditional hard drives to modern solid-state drives or cloud-based storage systems. The choice of storage technology for data storage component 126 depends on factors such as the volume of data, the required access speed, and the necessary security and privacy measures. In one non-limiting example, all servers and components of RI vault 120 are cloud-based.

In addition to user ID server 122, precise time, location, and environment server 124, and data storage component 126, the architecture of RI vault 120 may encompass additional features that enhance the integrity and security of the stored information. For instance, to prevent any corruption or degradation of data that could compromise its accuracy and the authenticity of its associated events, a data verification system could be employed to regularly check the consistency and accuracy of the stored data. A backup storage process may also be used to create redundancy and preserve copies of the original data to ensure that the data remains safe and retrievable, even in the face of circumstances such as hardware failure or accidental data loss. In some embodiments, any such backup storage servers are physically separated when not in use. Such separation can prevent simultaneous damage or unauthorized access to both the main and backup servers, thereby providing an additional layer of protection.

RI vault 120, acting as a central hub for data management, receives and processes a variety of communications and publications, referred to as 130 in FIG. 1, which are purportedly related to an individual or an event. These communications or publications 130 could make explicit or implicit claims about the presence of an individual or the occurrence of an event at a specific time and location. The claims may be articulated in various forms, such as text messages, voice recordings, videos, or social media posts. They may also be supplemented with additional data such as environmental conditions that provide additional context or information about the surroundings during the alleged incident.

The origins of communications and publications 130 may be diverse, reflecting the multitude of digital platforms that exist today. They may stem from other mobile devices, labeled as 132, which can include a wide range of equipment such as smartphones, tablets, wearables, etc. Servers, designated as 134, are another significant source of communications and publications 130. Social media servers, which are repositories for a vast amount of user-generated content, are one of many such examples. Servers 134 may provide data ranging from simple text-based posts to complex multimedia content, all of which could contain implicit or explicit claims about an individual's whereabouts or event occurrences. Streaming services, designated as 136, may also contribute to the stream of communications and publications. These platforms may provide real-time or recorded data streams such as (without limitation) live video or radio broadcasts, streaming podcasts, and the like, each potentially carrying assertions about time, location, and environmental conditions associated with an individual or event.

Upon receipt of a communication or publication 130, RI vault 120 initiates a comprehensive assessment to determine the authenticity of the received information, scrutinizing whether it is genuine or potentially a product of an AI-generated simulation. The evaluation process is systematic and involves multiple steps.

Initially, user ID server 122 identifies whether the individual or event referred to in the communication or publication 130 aligns with any individual or event that is documented within data storage component 126. This identification process could involve comparison of user names, identification numbers, or other unique identifiers.

Once user ID server 122 locates an individual or event match, server 124 retrieves the time, location, and environ-mental data associated with the identified individual or event from data storage 126 and compares it to the data stated or contained within the communication or publication 130. This comparison of the real and claimed data allows for a thorough examination of the authenticity of the communication or publication 130.

This comparative process may be executed automatically through application of a matching algorithm, or manually by presenting or displaying the data for human-based comparison. The automated process uses a matching algorithm to rapidly scan the time, location and possibly additional data within the communication or publication 130 and compares it to the time, location and additional data securely stored in RI vault 120. By meticulously comparing these sets of data, the algorithm can swiftly identify discrepancies or alignments, thereby gauging the validity of the communication or publication 130 presented. In addition to this automated comparison, the invention also provides a platform for human verification by presenting the securely stored and purported time and location data in a format to enable users to manually compare the data sets, thereby providing an additional layer of scrutiny.

The automated comparison approach leverages computational power and algorithmic precision to yield efficient and accurate results, while the manual comparison method provides the advantage of human judgment and discretion. By integrating both automated and human verification processes, the present invention offers a robust and comprehensive solution to the challenge of discerning genuine communications and publications from potentially manipulated ones. In one example, human verification could simply be a display showing a user's purported location and the user's actual location as securely stored in RI vault 120, enabling a comparison.

In sum, RI vault 120 conducts a meticulous examination of received communications and publications 130 to ascertain their authenticity. Through a multi-stage process involving user identification and data comparison, vault 120 assesses the legitimacy of the information, thus providing a robust defense against AI-generated simulations.

When RI vault 120 processes and verifies that the actual time, location, and potentially additional data (such as environmental conditions) associated with an individual or event aligns with the information claimed or contained in the communication or publication 130, it leads to a conclusive verification or validation. This affirmation attests to the authenticity of the communication or publication 130, confirming it as genuine and free from AI-generated distortions.

On the contrary, when a discrepancy is detected between the time, location, and additional data securely stored in RI vault 120 for a given individual or event, and the corresponding information claimed by or contained in the communication or publication 130, it triggers a refutation process. This disconfirmation challenges the authenticity of the communication or publication 130, raising the possibility that it could be a product of an AI-generated simulation. This disparity between the actual and claimed data creates a red flag, necessitating further scrutiny. Depending on the circumstances, the discrepancy may trigger immediate refutation and disavowal of the communication or publication 130, or it may trigger a more rigorous analysis, potentially involving other forms of verification or cross-referencing with additional data sources. In some scenarios, the individuals involved may be contacted for clarification or verification.

Stated another way, a digital "fingerprint" in this context may be conceptualized as a unique combination of time, location, and possibly additional data linked to a specific individual or event. The digital fingerprint represents a distinctive pattern or identifier, much like a human fingerprint, that can be used to authenticate or debunk claims presented in a communication or publication 130. Within the operational framework of RI vault 120, the RI fingerprint serves as a critical piece of validation or refutation. When the RI fingerprint stored in vault 120 aligns seamlessly with the digital fingerprint embedded within the communication or publication 130, it results in a successful validation. This affirmation indicates that the communication or publication 130 is genuine and accurately represents the time, location, and possibly environmental conditions of the associated individual or event. Conversely, if the RI fingerprint stored in vault 120 diverges from the digital fingerprint contained within the communication or publication 130, it culminates in a refutation. This refutation is strong evidence that the communication or publication 130 is not accurate and could potentially be distorted, possibly the product of an AI-generated simulation.

RI vault 120 is configured to execute comparisons in a real-time or near real-time context, allowing for instant verification of diverse forms of communication such as phone calls and text messages (originating, for example, from a mobile device 132), or information being streamed live (such as from a streaming service 136). Consider a situation in which a phone conversation is in progress, a text message is on its way to the recipient, or a live-streamed event is being broadcasted. As these real-time events unfold, RI vault 120 operates in the background, comparing the precise time and location data securely stored in the vault against the information associated with these ongoing communications.

This real-time or near real-time comparison process is a critical component of the system's ability to rapidly identify potential inconsistencies or anomalies. Any discrepancy between the actual and claimed data is a warning signal, indicating the possible use of AI-generated simulations or "deep fakes." This capability for real-time verification ensures a swift response, making it challenging for simulated content to propagate unnoticed, and thereby enhancing the overall trustworthiness and safety of digital communications. The ability of RI vault 120 to perform immediate and accurate verifications even while communications are in progress significantly elevates the level of security and trust in the digital sphere, offering reliable protection against the potential risks posed by AI-generated simulations.

The verification capabilities of RI vault 120 extend beyond real-time events and encompass retrospective analyses of communications or publications that have occurred in the past. RI vault 120 is configured to handle requests for post-event evaluations, including those that may emanate from a server 134, such as a social media server. Recorded visual and audio materials may be retrospectively analyzed after their circulation. RI vault 120 is configured to dissect various types of content—be it a podcast episode, a video message recorded earlier, or an article published in the past. System 100 and RI vault 120 cross-verify the timestamps and location data embedded within such pieces of content with the records that have been securely preserved in data storage 126.

As previously described, to enhance the depth of this verification, additional data points such as barometric pressure, temperature, humidity, etc., if available, can also be recorded and used in the comparative analysis. This additional layer of information serves to pinpoint the environmental conditions associated with the precise location and time of an individual or event. By including such supplemental data, RI vault 120 provides a more comprehensive and robust tool for verification, increasing the precision and reliability of the verification process.

The ability of RI vault 120 to perform both real-time and retrospective verifications makes it a versatile and powerful tool. Whether it's authenticating a live communication or verifying the truthfulness of a pre-recorded or published piece, the system is capable of effectively addressing the multifaceted challenges posed by AI-generated simulations.

Upon completing the verification process, RI vault 120 generates a set of comparison data 140. This data, which can include verification, refutation, and detailed comparative information, serves as a valuable asset for a diverse array of individuals and entities who may require access to this crucial information. Comparison data 140 may be conveyed to mobile devices 142, display devices 144 and a broad range of servers or computing devices 146 belonging to individuals and entities having a vested interest in the data. These individuals and entities may be the subjects of the communication or publication 130, or their operations may align with the data's relevance and importance.

The potential recipients of comparison data 140 are numerous, stretching across various sectors and scopes of interest. This can range from telecommunication companies responsible for transmitting digital communications, to local, state, and federal government bodies that handle matters of public interest and require such data to make informed decisions or carry out investigations. Media companies, both social and traditional, can benefit from this data to ensure the veracity of the content they disseminate, thereby maintaining their credibility. Judicial courts might require comparison data 140 as evidence in legal proceedings, reinforcing the integrity of the justice system. Search engine companies may utilize this data for purposes such as ranking and filtering search results based on authenticity. First responders such as police, paramedics, and fire services may use this information to validate emergency calls and to ensure that resources are not diverted based on fraudulent information.

Figure 2:
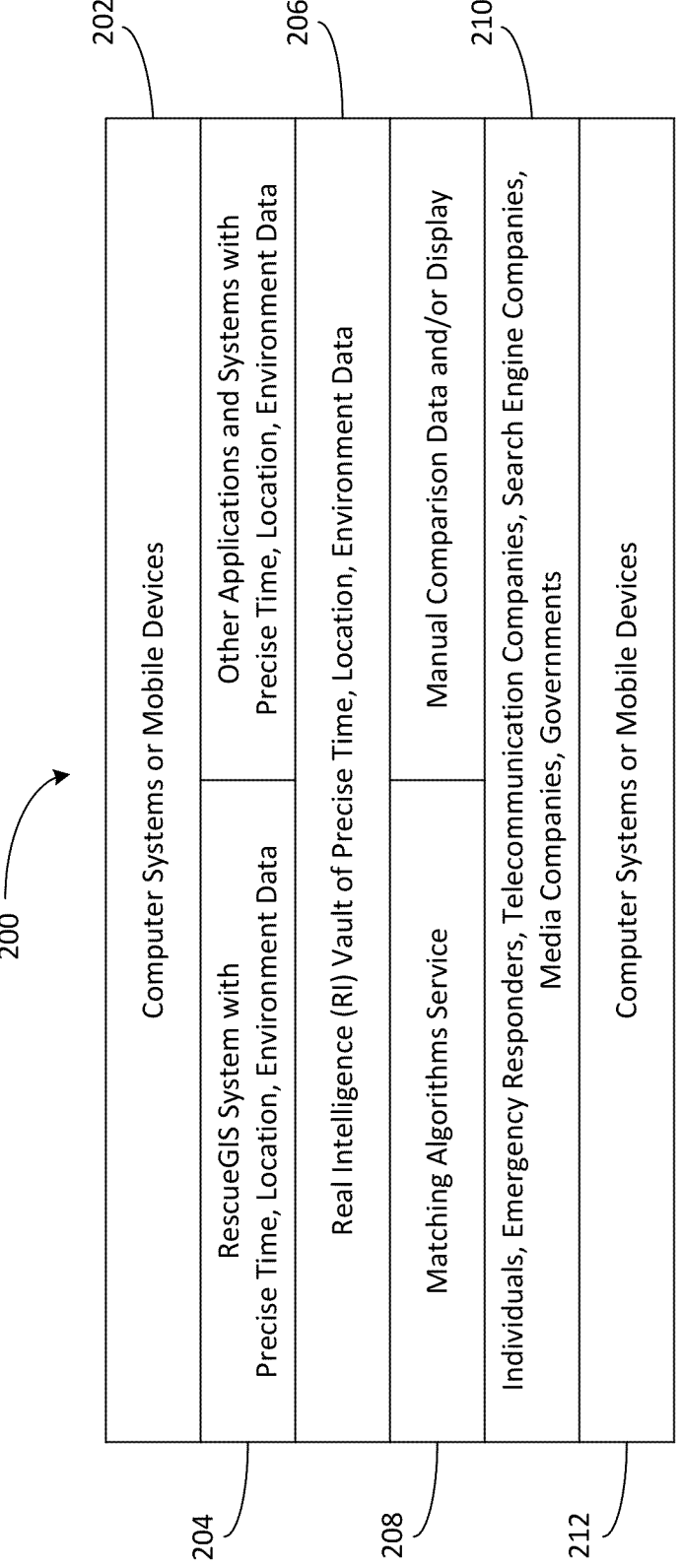
FIG. 2 is a layered architecture diagram of the system of FIG. 1, according to the present invention.

FIG. 2 is a layered architecture diagram 200 that illustrates the complex multi-level infrastructure and interaction between the components of system 100 for verifying authenticity against AI-generated simulations. Diagram 200 presents a comprehensive view of the data flow from the generation of time, location, and environmental data, through the secure storage in the RI vault, to the decision-making processes, and finally to the dissemination of the comparison data to relevant recipients.

First layer 202, "Computer Systems or Mobile Devices", represents the hardware level. Here, we find various types of mobile devices 112 such as smartphones, tablets, laptops, IoT devices, and computing devices such as servers 114. The devices of first layer 202 interact with users and generate location data, time data, and additional data such as environmental data associated with specific individuals or events.

Second layer 204 operates on the devices in first layer 202 and involves the software applications and systems that are tasked with gathering and generating precise time data, location data, and possibly additional data such as environmental conditions. Layer 204 includes applicant's exemplary "RescueGIS System", described above, which collects location data and time data from a system of IoT devices, as well as "Other Applications and Systems" which is akin to applications and systems 110 of FIG. 1 and refers to any other application or system incorporating technologies for generating precise time data and location data from the devices of layer 202.

Third layer 206 is the "Real Intelligence (RI) Vault of Precise Time, Location Environment Data". It corresponds to RI vault 120 of FIG. 1 which acts as a central secure repository for receiving and storing location data, time data, and additional data from second layer 204. Third layer 206 maintains a chronological and spatial record of individuals and events.

Fourth layer 208 represents the decision-making components. Layer 208 comprises the "Matching Algorithms Service", which applies matching algorithms in an automated manner to compare data from incoming communications or publications 130 with data stored in RI vault 120. Layer 208 further comprises "Manual Comparison Data and/or Display" which provides a means for human operators to manually review and compare the data if needed.

Fifth layer 210 represents the wide range of potential beneficiaries of the system output, including individuals, emergency responders, telecommunications companies, search engine companies, media companies, and governments. These parties and entities may receive the comparison data from fourth layer 210 for their respective use-cases, be it for personal confirmation, emergency response, content filtering, fact-checking, legal proceedings, policy-making, and so on.

Sixth layer 212 mirrors first layer 202 and is again designated "Computer Syst7ms or Mobile Devices". This signifies that the output from the system, in the form of the comparison data, is received and utilized by various computer systems and mobile devices belonging to the individuals and entities listed in fifth layer 210.

Figure 3:
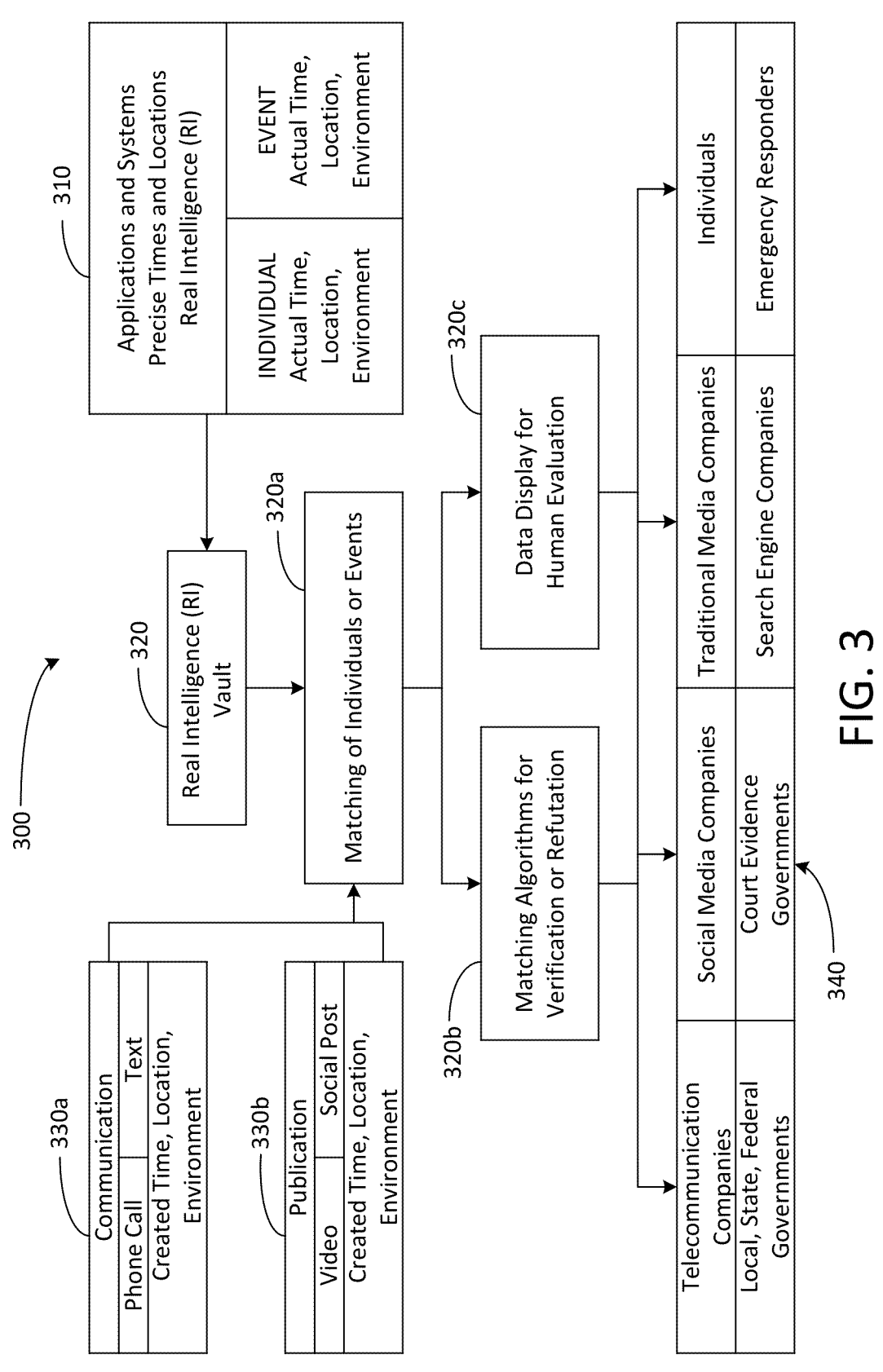
FIG. 3 is a flow diagram of a method performed by the system of FIG. 1, according to the present invention.

FIG. 3 is a flow diagram 300 of a method performed by system 100, according to the present invention. Flow diagram 300 provides a comprehensive visualization of how system 100 functions, starting from data collection to data analysis and finally data dissemination to relevant entities. It builds on the architecture shown in FIG. 2, detailing the interaction between different components of the system.

Method 300 commences with the "Applications and Systems Precise Times and Locations" block 310 which is bifurcated into two sub-categories, specifically "INDIVIDUAL Actual Time, Location, Environment" and "EVENT Actual Time, Location, Environment". "INDIVIDUAL Actual Time, Location, Environment" represents the data gathered from various devices like smartphones, tablets, and computers, that are employed by individuals. These devices, through numerous software applications and systems, capture and generate accurate time data, location data, and, where applicable, additional data such as environmental conditions associated with the individuals. "EVENT Actual Time, Location, Environment" encapsulates the data pertinent to specific occurrences or events. These events may be captured by the same types of devices, but instead of being tied to an individual's activity, they are linked with particular incidents or activities. Such events could range from concerts, public gatherings, to larger incidents such as terrorist attacks, accidents, and natural disasters, or any other circumstance where time data, location data, and possible additional data associated with an event can be collected.

Data generated by applications and systems 310, which includes precise time, location and possibly additional data such as environmental conditions, is transferred to RI vault 320. RI vault 320 serves as a secure data repository, capturing comprehensive details regarding time, location, and potentially additional data points related to specific individuals or events. Once this data is securely stored, it becomes a resource for the subsequent matching process, represented as block 320a in FIG. 3.

In addition to the data stored in RI vault 320, the matching process 320a incorporates inputs derived from external communications 330a and publications 330b. Both of these forms of input bring along their respective "created time, location, and environmental data." Communications 330a encompass communications such as phone calls and text messages, which are associated with their specific "created time, location, and environment data." These data points denote the time, location and possibly other conditions under which communications 330a were created and transmitted. Publications 330b denote output mediums such as videos and social media posts, which also carry their distinct "created time, location, and environment data." These data points represent the time, location and possibly other conditions under which publications 330b were created and disseminated.

Matching of individuals and events 320a may include "Matching Algorithms for Verification or Refutation" 320b, which uses automated methods to compare the data from RI vault 320 with the data from the received communication 330a or publication 330b, and/or by "Data Display for Human Evaluation" 320c, allowing for manual examination and comparison of the data from vault 320 and received communications and publications.

Finally, the output of this comparison process is disseminated to various entities and individuals 340. These recipients range from telecommunications companies, local, state, and federal governments, social and traditional media companies, courts, search engine companies, to individuals and emergency responders. Each of these recipients can then use the data in their respective domains, whether it's for verifying information, fact-checking, evidence for legal cases, emergency responses, or personal confirmation or denial of a publication or communication.

Figure 4:
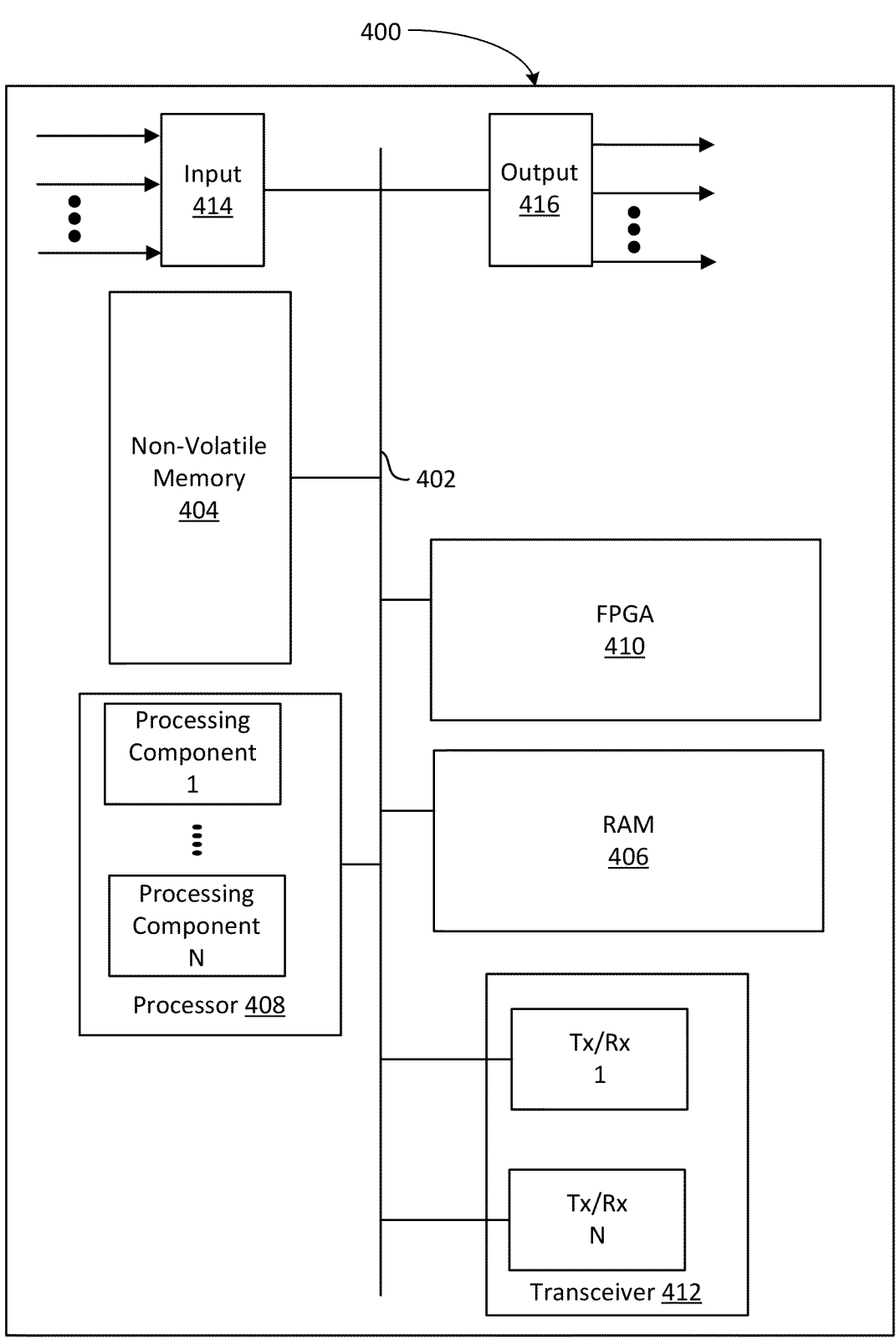
FIG. 4 is a conceptual block diagram of an exemplary computing system that may be utilized in connection with embodiments disclosed herein.

The system and methods described in connection with the embodiments disclosed herein, such as system 100 of FIG. 1 including RI vault 120 and applications and systems 110 and method 300 of FIG. 3, may be embodied directly in hardware, in processor-executable code encoded in a non-transitory tangible processor readable storage medium, or in a combination of the two. In this regard, FIG. 4 is a conceptual block diagram showing one non-limiting example of a computing system 400 that may be utilized in connection with embodiments disclosed herein. Computing system 400 depicts physical components that may be utilized, for example, in RI storage vault 120 and applications and systems 110 of system 100 of FIG. 1 and method 300 of FIG. 3.

Exemplary computing system 400 comprises bus 402 coupled to nonvolatile memory 404, random access memory ("RAM") 406, processor 408 that may include N processing components, field programmable gate array (FPGA) 410, and transceiver component 412 that may include N transceiver chains for communicating with external devices via wireless or wireline networks. Each of the N transceiver chains may represent a transceiver associated with a particular communication scheme (e.g., WiFi, Ethernet, Bluetooth, etc.). Input component 414 operates to receive one or more analog and/or digital signals and output component 416 operates to provide one or more analog or digital signals. None of these components are required, and any combination of these components may be included in the systems disclosed herein. For instance, where FPGA 410 is implemented, processor 408 may not be used, and vice versa.

Although the components in FIG. 4 are depicted as physical components, FIG. 4 is not intended to be a detailed hardware diagram; thus, many of the components depicted in FIG. 4 may be realized by common constructs or distributed among additional physical components. Moreover, it is contemplated that other existing and yet-to-be developed physical components and architectures may be utilized to implement the functional components described with reference to FIG. 4.

In general, nonvolatile memory 404 is non-transitory memory that functions to store (e.g., persistently store) data and processor-executable code (including executable code that is associated with effectuating the methods described herein). In some embodiments, nonvolatile memory 404 includes bootloader code, operating system code, file system code, and non-transitory processor-executable code to facilitate, for example, method 300 depicted in FIG. 3.

In some implementations, nonvolatile memory 404 is realized by flash memory, but it is contemplated that other memory types may be utilized as well. Although it may be possible to execute the code from nonvolatile memory 404, the executable code in the nonvolatile memory is typically loaded into RAM 406 and executed by one or more of the N processing components in processor 408.

Processor 408 and RAM 406 generally operate to execute the instructions stored in nonvolatile memory 404 to enable method 300 for operating system 100. For example, non-transitory, processor-executable code to effectuate the methods described herein may be persistently stored in nonvolatile memory 404 and executed by processor 408 in connection with RAM 406. As one of ordinarily skill in the art will appreciate, processor 408 may include a video processor, digital signal processor (DSP), micro-controller, graphics processing unit (GPU), or other hardware processing components or combinations of hardware and software processing components.

Some portions of this description are presented in terms of algorithms or symbolic representations of operations on data bits or binary digital signals stored within a computing system memory, such as a computer memory. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. Unless specifically stated otherwise, the use in this specification of terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

As will be appreciated by one skilled in the art, various aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as an "application", "module" or "system." Furthermore, aspects of the present invention may take the form of a computer program product embodied in one or more computer readable medium(s) having computer readable program code embodied thereon.

The flowcharts and block diagrams in the drawing figures illustrate the architecture, functionality, and operation of possible implementations of systems, methods, and computer program products according to various embodiments of this disclosure. In this regard, some blocks in the flowcharts and block diagrams may represent a module, segment, or portion of code, which comprises one or more executable instructions for implementing the specified logical function(s). In some implementations, the functions noted in the block may occur out of the order set forth in the drawings. For example, two blocks shown in succession may, in fact, be executed substantially concurrently, or be executed in the reverse order, depending upon the functionality involved. It will also be understood that each block and combinations of blocks in the flowcharts and block diagrams can be implemented by special purpose hardware-based systems that perform the specified functions or acts, or combinations of special purpose hardware and computer instructions.

This description is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the scope of this disclosure is not limited to the embodiments shown herein but is to be accorded the widest scope consistent with the principles and novel features disclosed herein.

The invention claimed is:

1. A system for validating communications and publications, comprising:

a mobile device comprising a clock, a global positioning system (GPS) component, and an environmental parameter sensor; and a secure data repository comprising a primary data storage, a user identification (ID) server, and a time, location, and environmental server, wherein the mobile device is configured to generate actual time data by the clock, actual location data by the GPS component, and actual environmental data by the environmental parameter sensor, wherein the actual time, location, and environmental data are associated with an actual individual or an actual event; and transmit the actual time, location, and environmental data associated with the actual individual or event to the secure data repository;

the primary data storage is configured to store the actual time, location, and environmental data associated with the actual individual or event;

the secure data repository is configured to receive a communication or publication comprising claimed time data, claimed location data, and claimed environmental data associated with a claimed individual or a claimed event;

the user ID server is configured to determine whether the claimed individual or event matches the actual individual or event stored in the primary data storage;

when the user ID server determines that the claimed individual or event matches the actual individual or event, the time, location, and environmental server is configured to compare the claimed time, location, and environmental data with the actual time, location, and environmental data;

when the time, location, and environmental server determines that the claimed time, location, and environmental data matches the actual time, location, and environmental data, the secure data repository is configured to generate a verification of authenticity of the communication or publication; and when the time, location, and environmental server determines that the claimed time, location, and environmental data does not match the actual time, location, and environmental data, the secure data repository is configured to generate a refutation challenging the authenticity of the communication or publication.

2. The system of claim 1, wherein the mobile device is further configured to regularly sample and transmit the actual time, location, and environmental data associated with the actual individual or event to the secure storage vault.

3. The system of claim 2, wherein the mobile device is further configured to sample and transmit the actual time, location, and environmental data associated with the actual individual or event to the secure storage vault in intervals ranging from daily to multiple times per second.

4. The system of claim 1, wherein the mobile device comprises a smartphone, a tablet, a computer, a smartwatch, a fitness tracker, an Internet of Things (IoT) device, a real-time location system (RLTS) device, or a GPS-equipped vehicle.

5. The system of claim 1, wherein the time, location, and environmental server is configured to compare the claimed time, location, and environmental data with the actual time, location, and environmental data in real-time for real-time communications.

6. The system of claim 1, wherein the secure storage vault is further configured to deliver the verification or refutation of the authenticity of the communication or publication to entities comprising telecommunications companies, governments, media companies, courts, search engine companies, individuals, and emergency responders.

7. The system of claim 1, wherein
the system is configured to delineate geographic boundaries of a geographic area; and
the time, location, and environmental server is configured to compare the actual time, location, and environmental data with the claimed time, location, and environmental data within the geographic boundaries of the geographic area.

8. A method for validating communications and publications comprising:

receiving, by a secure data repository, actual time data generated by a clock of a mobile device, actual location data generated by a GPS component of the mobile device, and actual environmental data generated by an environmental parameter sensor of the mobile device, wherein the actual time, location, and environmental data are associated with an actual individual or an actual event;

storing, by a primary data storage of the secure data repository, the actual time, location, and environmental data associated with the actual individual or event;

receiving, by the secure data repository, a communication or publication comprising claimed time data, claimed location data, and claimed environmental data associated with a claimed individual or a claimed event;

determining, by a user identification (ID) server of the secure data repository, whether the claimed individual or event matches the actual individual or event stored in the primary data storage;

when the user ID server determines that the claimed individual or event matches the actual individual or event, comparing, by a time, location, and environmental server of the secure data repository, the claimed time, location, and environmental data with the actual time, location, and environmental data;

when the time, location, and environmental server determines that the claimed time, location, and environmental data matches the actual time, location, and environmental data, generating, by the secure data repository, a verification of authenticity of the communication or publication; and when the time, location, and environmental server determines that the claimed time, location, and environmental data does not match the actual time, location, and environmental data, generating, by the secure data repository, a refutation challenging the authenticity of the communication or publication.

9. The method of claim 8, wherein the actual time, location, and environmental data is received by the secure data repository and stored in the primary data storage at regularly sampled intervals.

10. The method of claim 9, wherein the regularly sampled intervals range from daily to multiple times per second.

* * * * *